Oct. 31, 1961     E. LEWIS     3,006,105
CASTING APPARATUS
Filed Jan. 25, 1955
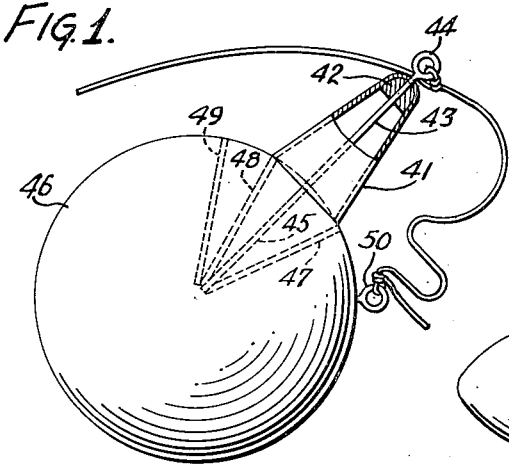
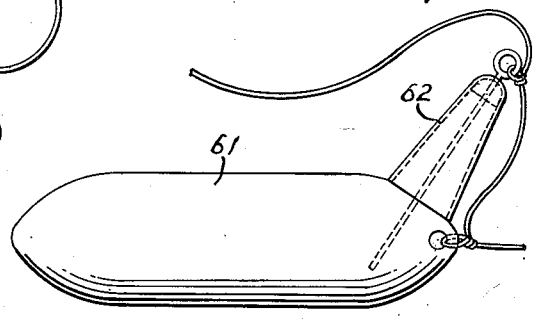
INVENTOR:
ELMER LEWIS
BY Howson & Howson
ATTYS.

3,006,105
CASTING APPARATUS
Elmer Lewis, Box 760, Eustis, Fla.
Filed Jan. 25, 1955, Ser. No. 483,983
3 Claims. (Cl. 43—44.99)

This invention relates to an improvement in fishing tackle and in a particular sense in tackle for casting chum into relatively remote fishing areas.

More broadly stated, the invention has for an object the provision of an improved device for regulating the effective length of a cast.

Another object is to provide a regulating device of the stated character which may be manually set for the desired length of cast and which then will operate automatically to afford the desired length.

To the aforesaid ends the invention contemplates the use of a fishing float, or similar body, as a functional element of the chum or other casting apparatus and as a medium for controlling the casting operation with respect to the point within the potential range of the cast wherein the chum is released.

Another object of the invention is to provide a casting float having means for distributing chum within a selected fishing area.

Still another object of the invention is to provide a structurally simple and relatively inexpensive chum casting device which may be readily applied to existing floats.

A further object is to provide a sinker of novel construction comprising means for distribution of chum or other luring medium within a predetermined fishing area.

The invention resides also in certain novel structural features and arrangements hereinafter described and illustrated in the attached drawings wherein:

FIG. 1 is a side view, partly in section, of a casting float and a chum distributor made in accordance with the present invention; and FIG. 2 is a side elevational view illustrating an embodiment of the casting float and chum distributor illustrated in FIG. 1 but utilizing a different form of casting float.

With reference to FIG. 1 of the drawings, the assembly therein illustrated comprises a spherical casting float 46 which may be of conventional type and material. The float has an eyelet 50 by means of which a fishing line extending from a casting rod, for example, may be attached to the float in the conventional manner.

In accordance with the present invention a chum receptacle or chum distributor 41 is provided interconnected with the float. The chum receptacle, in the present instance, is generally of thimble shape or bell shape and may be made of metal or plastic or other suitable material. While the chum receptacle may be made of plastic or similar material of light weight, there is provided in the bottom or closed end thereof a weight 42. A rod 43 extends longitudinally through the chum receptacle. At the closed end of the receptacle the rod 43 forms an eyelet 44 to which the line secured to the eyelet 50 is attached with the line extending beyond the eyelet 44 and having, for example, a fish hook (not shown) attached to its outer end. At the other or open end of the receptacle the rod 43 extends beyond the receptacle and is adapted for insertion in a bore 45 which extends radially into the spherical float 46. The rod fits freely in the bore 45 and when, in the cast, the float has been turned angularly by the unbalanced weight of the receptacle 41 so that the latter leads the float, the rod and the receptacle will separate from the float with the resultant distribution of the chum contained within the receptacle. The separation of the chum receptacle from the float is due to the fact that when the float has been cast and the entire assembly is moving freely through the air the unbalanced mass of the receptacle with its contained chum will tend to turn the float so that the receptacle is in front of the float. When the receptacle is in front of the float the receptacle will move rapidly ahead of the float to the full extent permitted by the length of the line interconnecting the eyelets 50 and 44 by reason of the greater weight and relatively smaller wind resistance of the receptacles compared to the light weight and larger size of the float. When the receptacle is moved in advance of the float to the full extent permitted by the line interconnecting the eyelets 50 and 44 the position of the receptacle will be reversed by its own inertia permitting discharge of the particles of chum contained within the receptacle. The chum will thus be distributed over the desired remote area. This form is particularly adapted for use in existing floats wherein all that is necessary is the boring or drilling of a recess in the body of the float permitting the receptacle to be attached to the float. This embodiment is also readily susceptible to provision of means for regulating the point of chum-release through the simple expedient of forming a plurality of sockets, such as indicated in 47, 48, and 49 similar to the bore 45 and similarly adapted to receive the rod 43, the sockets arranged in radial sequence in a plane intersecting the eyelet 50. Insertion of the rod 43 in the socket 47 will extend the time between the cast and the release of the receptacle and the release will be accelerated progressively as the rod is moved toward the socket 49.

In the embodiment illustrated in FIG. 2 a float 61 of generally torpedo-shape is provided and in connection with this float a chum receptacle 62 similar to the chum receptacle 41 of the embodiment of FIG. 1 is employed. Preferably the chum receptacle 62 is mounted near the captive end of the float 61 as illustrated in order to accelerate the release of the receptacle and discharge the chum contents. It is obvious however, that the receptacle 62 might be mounted in other positions longitudinally of the float 61 as might be found desirable under particular conditions.

It will be noted that in the illustrated embodiments the weighted chum receptacle is adapted to function also as a sinker for the hooked end of the line so that it may assume a double function. While the device is associated with a casting float in the illustrated embodiments, it will be apparent that it may be used as a distributor for a chum independently of the fishing line or hook. The line to which the hook is attached may be removed without impairment of the chum casting device and in such case the float becomes a simple carrier for the chum receptacle. The device may be used also to the exclusion of the chum distributing function as a means for regulating the distance of a cast by separating the sinker from the float at a selected point within the maximum casting range. In this case, separation of the sinker from the float has the effect of extending the length of the cast, particularly when the separation occurs before the float and sinker unit has reached the top of the trajectory.

I claim:
1. Casting apparatus adapted to be secured to a fishing line comprising a carrier member, means on the peripheral surface of said carrier member to which the fishing line is adapted to be secured, a hollow rider member having an interior chamber therein, means defining an access opening in said rider to said interior chamber in said rider member, rider-retaining means on the carrier displaced relative to the point of attachment of the fishing line to the carrier so that when the carrier is freely supported from the line the retaining means is offset laterally from the axis of the fishing line, said rider retaining means including a member operable to retain the rider on the carrier in position wherein the said access opening is effectively closed by a confronting surface of the carrier, said rider retaining means being positioned relative to the point of attachment to the fishing line so that the mass of the rider member carried by the retaining means will tend to displace the carrier about the said point of attachment toward a position wherein the retaining means is no longer effective to retain the rider on the carrier when the carrier is freely suspended from the fishing line, the relative masses of the rider and the carrier, and the extension of the said offset being such that when the rider and carrier assembly is freely suspended from the said fishing line, the amount of said displacement is insufficient to release the rider from the retaining means so that said assembly may be cast as a unit, and the said relative masses of the rider and carrier and their respective forms being such that in free flight, after being cast as a unit, the retardation of the carrier, due to air resistance, will exceed the retardation of the rider from the same cause to an extent permitting a displacement of the carrier by the rider to free the rider from the retaining means while the assembly is in flight, and a flexible line secured to the carrier and to the rider at a point on the rider opposite the open end of said cavity to thereby cause the rider, when free from said carrier, to assume a position wherein material contained in said rider cavity may be displaced by gravity from the rider.

2. Casting apparatus according to claim 1 wherein the rider retaining means comprises a socket in the carrier member for reception of at least a part of the rider member.

3. Casting apparatus according to claim 2 wherein the major mass of the rider as a whole is concentrated at the side thereof remote from the access opening.

References Cited in the file of this patent

UNITED STATES PATENTS

| | | |
|---|---|---|
| 2,457,715 | Pazzano | Dec. 28, 1948 |
| 2,531,418 | Fitzharris | Nov. 28, 1950 |
| 2,597,317 | Gross | May 20, 1952 |
| 2,612,718 | Steinberg | Oct. 7, 1952 |
| 2,687,592 | Purcell | Aug. 31, 1954 |
| 2,729,912 | Moffett | Jan. 10, 1956 |

FOREIGN PATENTS

| | | |
|---|---|---|
| 907,251 | France | Mar. 7, 1946 |